(12) United States Patent
Keller et al.

(10) Patent No.: US 8,885,603 B2
(45) Date of Patent: Nov. 11, 2014

(54) HANDOVER OF CALLS BETWEEN ACCESS NETWORKS

(75) Inventors: Ralf Keller, Wurselen (DE); Fredrik Lndholm, Stockholm (SE); Karl-Peter Ranke, Herzogenrath (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 86 days.

(21) Appl. No.: 13/459,520

(22) Filed: Apr. 30, 2012

(65) Prior Publication Data
US 2013/0272194 A1 Oct. 17, 2013

Related U.S. Application Data

(63) Continuation of application No. PCT/EP2012/057025, filed on Apr. 17, 2012.

(51) Int. Cl.
*H04W 36/00* (2009.01)

(52) U.S. Cl.
USPC ............................................ 370/331; 455/436

(58) Field of Classification Search
None
See application file for complete search history.

(56) References Cited

U.S. PATENT DOCUMENTS

| | | | |
|---|---|---|---|
| 2011/0051691 A1* | 3/2011 | Hietalahti et al. | 370/331 |
| 2013/0063540 A1* | 3/2013 | Zisimopoulos et al. | 348/14.02 |
| 2013/0142168 A1* | 6/2013 | Vedrine et al. | 370/331 |

* cited by examiner

*Primary Examiner* — Marcus R Smith
(74) *Attorney, Agent, or Firm* — Rothwell, Figg, Ernst & Manbeck, P.C.

(57) ABSTRACT

A method is provided of performing a session transfer with Single Radio Voice Call Continuity, SRVCC, from a Packet Switched, PS, access to a Circuit Switched, CS, access of a telecommunications session that has been established over the PS access via an IP Multimedia Subsystem, IMS, network. A request for the transfer of the session is received. An indication of a voice codec that is currently being used for the session is obtained from the IMS network. Allocation of resources for the session in the CS access network is initiated, including specifying the voice codec to be used based on the obtained codec indication. Transfer of the session to the CS access is initiated so that the session continues with use of the specified voice codec.

13 Claims, 4 Drawing Sheets

401 Receive request for PS to CS handover

402 Obtain indication of current codec

403 Initiate allocation of CS resources, including selected codec

404 Initiate handover of session to CS access with selected codec

HANDOVER OF CALLS BETWEEN ACCESS NETWORKS

CROSS REFERENCE TO RELATED APPLICATION(S)

This application is a continuation of International Application No. PCT/EP2012/057025, filed Apr. 17, 2012. The patent application identified above is incorporated herein in its entirety by reference.

TECHNICAL FIELD

The present invention relates to methods and apparatus in a telecommunications network for improving handover of a call from a Packet Switched (PS) access network to a Circuit Switched (CS) access network. More particularly, the invention relates to a handover with Single Radio Voice Call Continuity (SRVCC).

BACKGROUND

IP Multimedia services provide a dynamic combination of voice, video, messaging, data, etc, within the same session. This has lead to a growth in the numbers of basic applications and the media which it is possible to combine, leading to a growth in the number and variety of services offered to the end users—so-called "combinational IP Multimedia" services.

IP Multimedia Subsystem (IMS) is the technology defined by the Third Generation Partnership Project (3GPP) to provide Internet Protocol (IP) Multimedia services over mobile communication networks. IMS provides key features to enrich the end-user communication experience through the integration and interaction of services both person-to-person (client-to-client) as well as person-to-content (client-to-server) communications over an IP-based network. The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session.

FIG. 1 illustrates schematically how the IMS fits into the mobile network architecture in the case of a General Packet Radio Service (GPRS) access network. Although numerous network entities, or nodes are depicted, only those relevant to the present discussion have been assigned reference numerals. As shown in FIG. 1 control of communications occurs at three layers (or planes). The lowest layer is the Connectivity Layer 1, also referred to as the bearer plane and through which signals are directed to/from user equipment (UE) accessing the network. The entities within the connectivity layer 1 that connect an IMS subscriber to IMS services form a network that is referred to as the IP-Connectivity Access Network (IP-CAN). The GPRS network includes various GPRS Support Nodes (GSNs). The middle layer is the Control Layer 4, and at the top is the Application Layer 6.

The IMS 3 includes a core network 3a, which operates over the middle, Control Layer 4 and the Connectivity Layer 1, and a Service Network 3b. The IMS core network 3a includes nodes that send/receive signals to/from the GPRS network via the GGSN 2 at the Connectivity Layer 1 and network nodes that include Call/Session Control Functions (CSCFs) 5. The CSCFs 5 operate as SIP proxies within the IMS in the middle, Control Layer 4. Other IMS core network entities shown include a Media Resource Function Controller (MRFC), a Border Gateway Control Function BGCF and a Media Gateway Control Function, (MGCF). The IMS also includes a Home Subscriber Server (HSS) 5a, which supports the IMS nodes that handle calls and performs authentication and authorization of the user. The top, Application Layer 6 includes the IMS service network 3b. Application Servers (ASs) 7 are provided for implementing IMS service functionality.

As shown in FIG. 1, User Equipment (UE) can access the IMS by attaching to an access network and then over the Connectivity Layer 1, which is part of a PS domain. If the UE attaches to the network via a PS access network, such as a 3GPP Long Term Evolution (LTE) access network, an IMS session can be set up by the UE using SIP signalling. However, many existing access networks operate only using CS technology, and a UE may also access IMS services via a CS domain 8. Although the CS domain 8 will not handle SIP, procedures are well established for dealing with the provision of media and services between the IMS and a UE using a CS access. In a CS access, A UE attaches via a Radio Access Network (RAN—such as a Global System for Mobile Communications (GSM) Edge RAN, GERAN), which is communicatively coupled to a Mobile Switching Centre (MSC) 9.

There are many occasions when during a call/session it is required to transfer or hand over the call/session from one access network to another. There are a variety of factors that are used to determine when a call needs to be handed over to another access network, but these are not particularly relevant to the present discussion. Generally, the access network determines, based on the cells for which the UE reports measurements, when the conditions arise that require a request to be made to the core network for the call to be handed over.

Single Radio Voice Call Continuity (SRVCC) is described in 3GPP TS 23.237 V11.2.0 (2011-09), referred to hereafter as TS 23.237, and 3GPP TS 23.216 V11.2.0 (2011-09), referred to hereafter as TS 23.216. These specify procedures for handover of a call from a PS access to a CS access (e.g. transfer of a Voice-over-IP, VoIP, IMS session from an evolved Universal Mobile Telecommunications System (UMTS) Terrestrial RAN, E-UTRAN, to a UTRAN/GE-RAN). When a UE performs a SRVCC handover, the MSC 9 obtains information on the codecs supported by the UE from a Mobile management Entity (MME), but it does not know which of these supported codecs is actually being used by the UE on the PS access (e.g. LTE or High Speed Packet Access, HSPA). Before interacting with the IMS (sending the session transfer request), the MSC needs to allocate resources in the target CS access network (i.e. in a Base Station Controller, BSC or a Radio Network Controller RNC). As part of this procedure a codec to be used for the call during the CS access is selected. This may result in a different codec being selected for the session on the CS access than was being used on the PS access. As a consequence there may be degradation of the speech quality, for example from Adaptive Multi-Rate Wideband (AMR-WB) speech coding used in the PS domain before the SRVCC handover to Adaptive Multi-Rate Narrowband (AMR-NB) used in the CS domain after the SRVCC handover. Also, the use of different codecs results in inefficient use of resources due to transcoding that has to be performed by a media gateway (MGW—either an Mobile, M-MGW, or an Access Transfer Gateway, ATGW) after the SRVCC handover. The transcoding itself may also lead to a deterioration in speech quality.

SUMMARY

A first aspect provides a method of performing a session transfer with Single Radio Voice Call Continuity, SRVCC, from a Packet Switched, PS, access to a Circuit Switched, CS, access of a telecommunications session that has been established over the PS access via an IP Multimedia Subsystem, IMS, network. A request for the transfer of the session is received. An indication of a voice codec that is currently being used for the session is obtained from the IMS network. Allocation of resources for the session in the CS access network is initiated, including specifying the voice codec to be used based on the obtained codec indication. transfer of the session to the CS access is initiated so that the session continues with use of the specified voice codec.

A second aspect provides a Mobile Switching Centre, MSC, server of a telecommunications network. The MSC server includes an input/output for sending and receiving messages to/from other network entities. A memory stores data and programming instructions. A processor implements the programming instructions to action a request for transfer of a session established over a Packet Switched, PS, access via an IP Multimedia Subsystem, IMS, network to a Circuit Switched, CS, access with Single Radio Voice Call Continuity, SRVCC. The processor implements the programming instructions to obtain from the IMS network an indication of a voice codec that is currently being used for the session. The processor implements the programming instructions to initiate allocation of resources for the session in the CS access network, including specifying the voice codec to be used based on the obtained codec indication. The processor implements the programming instructions to initiate transfer of the session to the CS access so that the session continues with use of the specified codec.

In other words, when the MSC receives the PS to CS handover Request it obtains (e.g. from the ATCF) the information about the currently used voice codec prior to allocating resources in the RAN. In doing so, other media information can also be provided to the MSC, e.g. payload type numbers used in RTP. The MSC may obtain the information by querying the IMS, or by sending the session transfer request early and obtaining the currently used codec (and other media) information in the response, so that it can then specify the codec to be used when initiating the transfer.

Other aspects include a computer program for programming a computer in a network, and a computer program product comprising instructions for enabling a computer in a network to implement this methodology.

DETAILED DESCRIPTION

Figure 1:
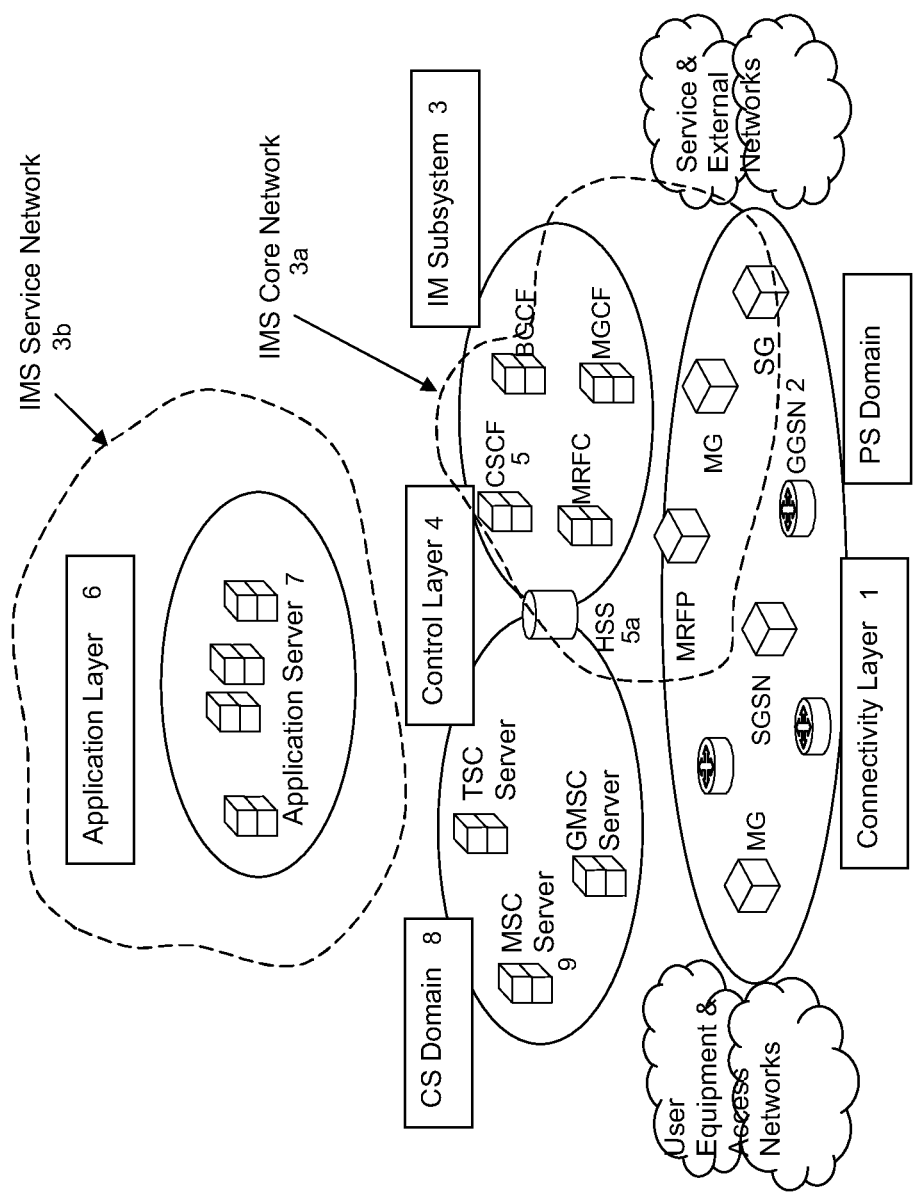
FIG. 1 is a schematic illustration showing how the IMS fits into the mobile network architecture in the case of a GPRS access network.
Figure 2:
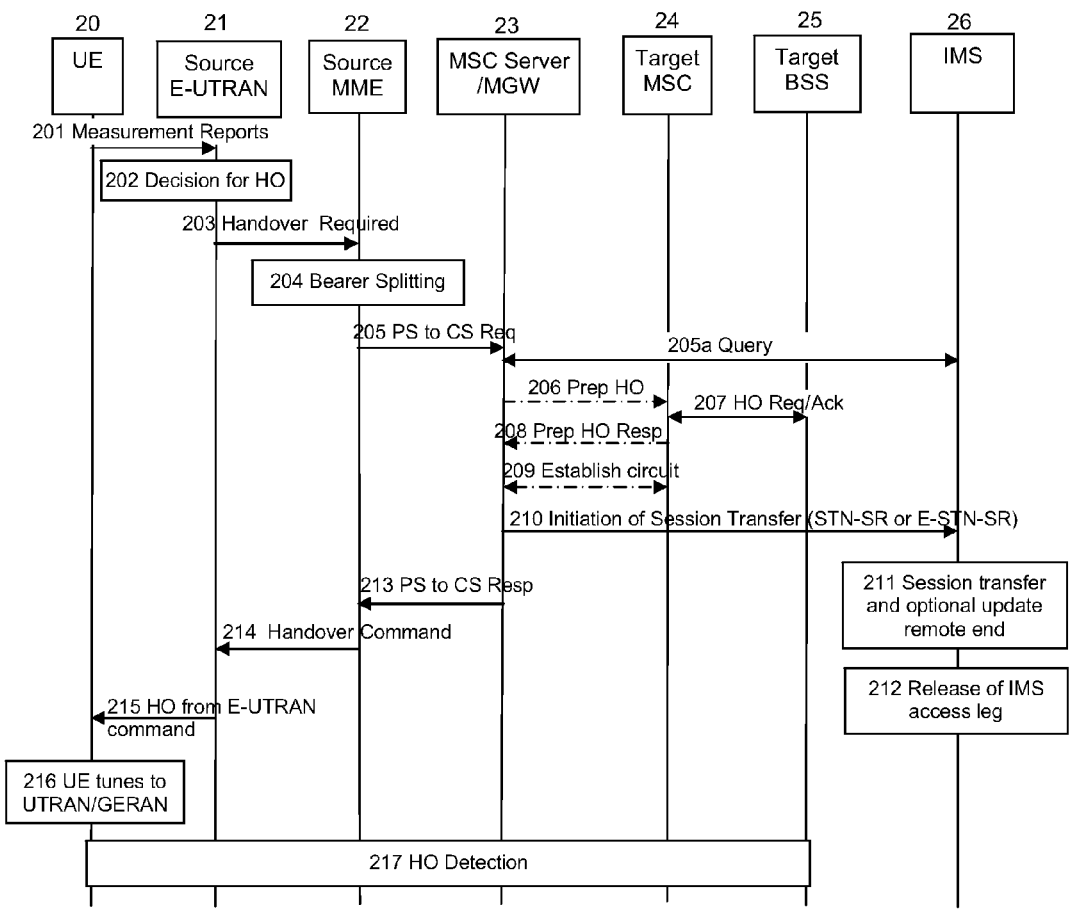
FIG. 2 is a signal diagram of part of one embodiment of a SRVCC handover procedure.

Referring to FIG. 2, this illustrates the signalling involved in part of a SRVCC handover procedure for a first embodiment. In this embodiment, the codec information is obtained by an MSC server 23 sending a query to the IMS 26. The MSC server 23 is shown together with an associated MGW that the MSC server will select for the CS access. The other entities shown include a UE 20 which is engaged in a call and is accessing the IMS 26 via a PS access network, which in this case is an E-UTRAN, designated as the Source E-UTRAN 21. Mobility management is handled by a Source MME 22. Also shown are a target MSC 24 and a target Base Station Server (BSS) 25 in the target CS access network to which the call will be transferred in a SRVCC handover. The example signal flow shown in FIG. 2 is for transfer to a GERAN without Dual Transfer Mode (DTM). However, the same principles can be applied to other call cases as documented in TS 23.216.

Signals 201 to 205 are the same as specified in TS 23.216. Briefly, signal(s) 201 represent measurement reports sent from the UE 20 to the source E-UTRAN 21, and based on which the E-UTRAN 21 decides at step 202 to request a SRVCC handover. The Source E-UTRAN 21 sends a SRVCC Handover Required message 203 to the source MME 22 to request the handover. This Handover Required message 203 includes an ID of the target GERAN (CS access network) to which the call is to be transferred and indicates to the MME 22 that this is a SRVCC handover operation only towards a CS domain. At step 204 the source MME 22 splits the voice bearer from the non-voice bearers. The source MME 22 initiates the PS-CS handover procedure for the voice bearer only by sending a SRVCC PS to CS Request message 205 to the MSC Server 23. This message 205 also includes information about the call, including the International Mobile Subscriber Identity (IMSI), the Correlation Mobile Subscriber Integrated Services Digital Network Number (C-MSISDN), the Session Transfer Number for SRVCC (STN-SR), and supported codecs.

Now the MSC Server 23 exchanges a query and response 205a with the IMS 26 (e.g. an ATCF or a Service Centralisation and Continuity AS-SCC AS in the IMS 26). Using the information received from the MME 22 (IMSI, C-MSISDN, STN-SR, supported codecs) the query 205a requests provision of information identifying the currently used codec, as well as other information it may require relating to the session media, such as payload type number to be used in the Real-time Transport Protocol (RTP). The query 205a may be, for example, a SIP MESSAGE or SIP INFO. The IMS 26 (ATCF/SCC AS) handles this request with priority and responds as quickly as possible. The priority may be determined based on the content of the query or by an additional priority indicator in the query message 205a. Based on the query response, the MSC server 23 determines the codec that needs to be used for the CS access and any other information it has requested such as the payload type numbers. The MSC server 23 uses this information in the subsequent procedure, as shown in signals 206 to 217, which essentially follow the standard procedure subject to the following additional indications.

The MSC Server 23 converts the PS to CS handover request 205 into a CS inter-MSC handover request by sending a Prepare Handover Request message 206 to the target MSC 24. The Prepare Handover Request message 206 includes an indication of the voice codec that was provided in the query response at 205a. The Target MSC 24 performs resource allocation with the Target BSS 25 by exchanging Handover Request/Acknowledge messages 207. At this point, the Target BSS 25 is also informed of the codec to be used. Signals 208 and 209 follow the standard procedure in which the Target MSC 24 sends a Prepare Handover Response message 208 to the MSC Server 23, and in signal exchange 209 a circuit connection is established between the target MSC and the MGW associated with the MSC Server 23.

In signal 210 the MSC Server 23 initiates the transfer of the session by sending a SIP INVITE message towards the IMS 26 using, for a non-emergency session, the STN-SR, or for an emergency session the Emergency STN-SR (E-STN-SR). Provided that appropriate resources could be allocated in step 207, signal 210 includes, in the Session Description, information of the codec to be used, as obtained in step 205a, as well as other information relating to the session. This information is required for the session set-up procedure. In this case, the information is also required because, in the SDP where the codec is specified, other parameters from the MSC Server/MGW 23 are also required, such as the IP address and port to be used for the MSC Server/MGW 23. Thus, the Invite 210 with SDP (and codec) confirms to the IMS 26 that the transfer is taking place, and includes other information that the IMS 26 does not yet know about (such as IP address/ports).

The remaining signals follow the standard procedure, in which at step 211 the remote end is updated with the SDP of the CS access leg, and the downlink flow of the voice media is switched to the CS access leg. At step 212 the source IMS access leg is released. Signal 213 is a SRVCC PS to CS Response message sent from the MSC Server 23 to the Source MME 22. Signal 214 is a Handover Command message sent from the Source MME 22 to the Source E-UTRAN 21, which includes information about the voice media component only. Signal 215 is a Handover from E-UTRAN Command message sent from the Source E-UTRAN 21 to the UE 20. At step 216 the UE 20 tunes to the GERAN. At step 217, the handover is detected by the network entities and the procedure continues to its conclusion as defined in the standard.

Figure 3:
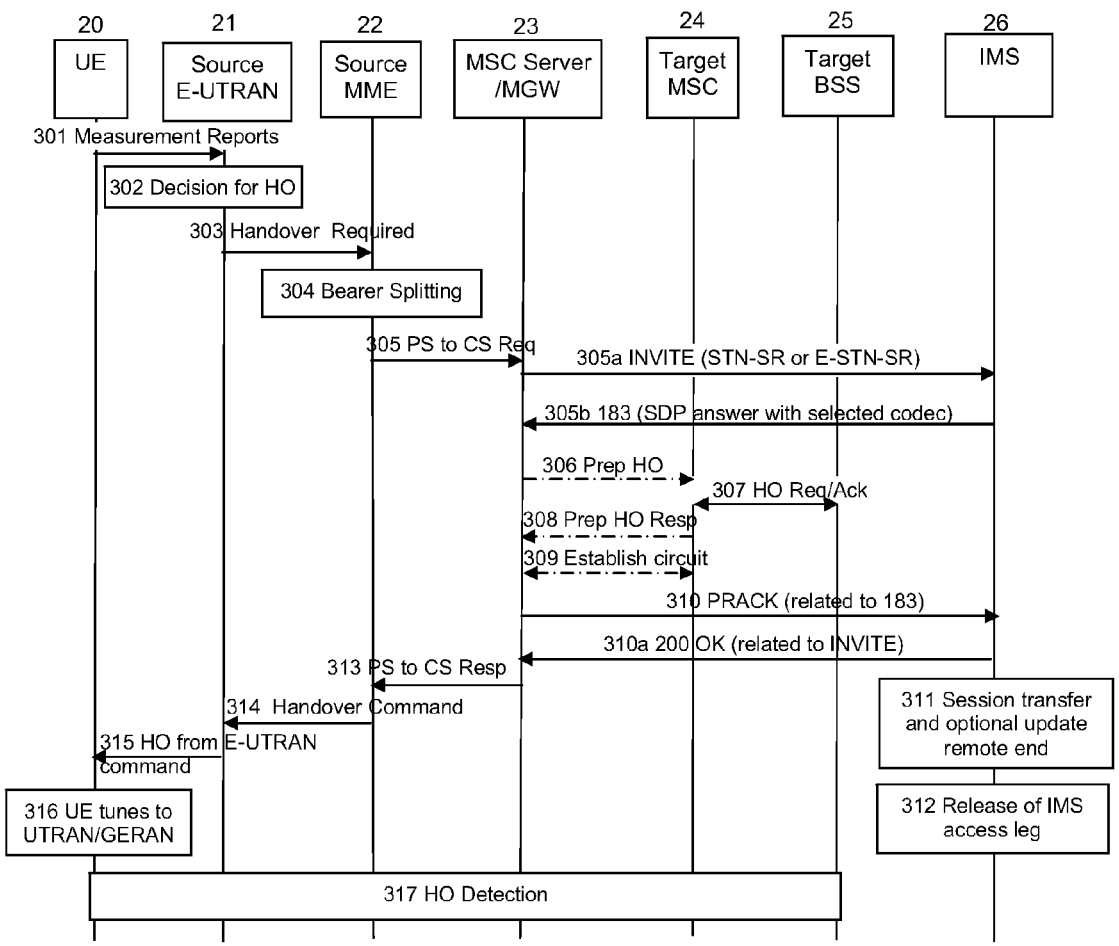
FIG. 3 is a signal diagram of part of another embodiment of a SRVCC handover procedure.

Referring to FIG. 3, this illustrates the signalling involved in part of a SRVCC handover procedure for a second embodiment. The same network entities are involved as in the embodiment of FIG. 2. In this embodiment, the codec information is obtained by the MSC server 23 in response to an early initiation of the session transfer. For this to occur, the entity (ATCF or SCC-AS) in the IMS 26 needs to be configured to reply with a provisional response to the session initiation request (SIP INVITE).

Signals 301 to 305 follow the standard and are the same as described above for FIG. 2. Now, in signal 305a, the MSC Server 23 starts the session transfer procedure by sending the INVITE (equivalent to signal 210 in the FIG. 2 embodiment) using the information it received from the Source MME 22 (IMSI, C-MSISDN, STN-SR). Because at this stage the MSC server will not yet have selected a MGW for the transferred call, the INVITE may be an empty Invite without any SDP information. The ATCF/SCC AS in the IMS 26 handles this request with priority and responds as quickly as possible with a provisional response (a SIP 183 message) 305b. As with the first embodiment described above, the priority may be determined based on the content of the query or by an additional priority indicator in the Invite message 305a. The 183 response 305b includes information about the codec and any other required information such as the payload types. The IMS 26 remote end selects the most suitable codec. The remote end is the next node that handles media related interactions, and may, for example, be the ATCF (controlling the ATGW) or an MGCF (controlling an IM MGW). If there are no media gateways on the media path, then the remote end can also be a terminal. If the codec already used in the (PS access) session exists for the CS access, this codec will be selected and used in the 183 response 305b. If the INIVITE 305a from the MSC did not include SDP information, the IMS 26 entity (ATCF/SCC AS) will include an SDP offer in the 183 message 305b with appropriate SDP for the currently ongoing session. The MSC Server 23 waits for the 183 response and then determines the codec that needs to be used in the CS access and the payload types used in RTP before proceeding with the handover request at signal 306.

Signals 306 to 309 are the same as signals 206 to 209 of the first embodiment. Thus, the Prepare Handover Request message 306 sent from the MSC server 23 to the target MSC 24 includes an indication of the voice codec that was provided in the 183 response 305b. Also, when the Target MSC 24 performs resource allocation with the Target BSS 25 by exchanging Handover Request/Acknowledge messages 307, the Target BSS 25 is informed of the codec to be used.

When the MSC server 23 is ready to have the session media transferred to the CS access, e.g. after signal 309, it sends the PRACK acknowledgement message 310 (related to the SIP 183 message 305b) to the IMS 26. This is done to confirm the selected codec and initiate the transfer of the media. If resources could not be granted in the RAN by previous steps (206-209), the MSC Server 23 sends a CANCEL message to abort the session transfer. Otherwise, the IMS 26 responds with a SIP 200 OK message 310a (related to the INVITE 305a) when the media has been transferred.

The remainder of the procedure steps/signals 311-317 follow the standard and are the same as steps/signals 211-217 described above for the first embodiment.

Note that the procedures described above refer principally to the codec, as this is where the major advantages of the new procedures lie. However, it should be noted that the SDP in the SIP messages (such as INVITE) used in the call set-up and handover procedures can include a large number of parameters. The codec is one parameter but there will usually be other media related information that is required or is advantageous to include.

Figure 4:
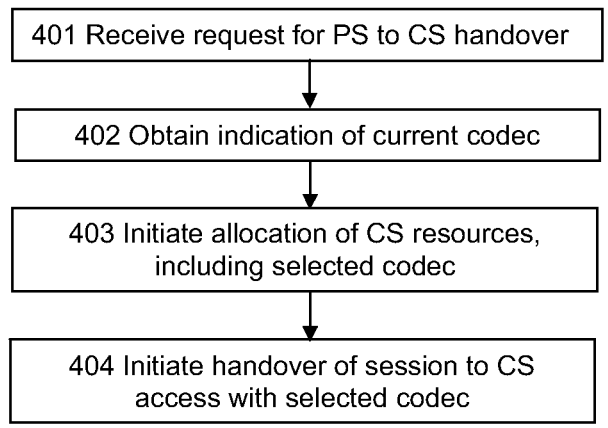
FIG. 4 is a flow diagram illustrating a series of steps in a SRVCC handover method.

FIG. 4 is a flow diagram illustrating the principal method steps involved. At step 401 a request is received for a SRVCC, PS to CS handover of a call. At step 402, an indication of the current codec being used in the call (PS access) is obtained. As described above other media parameters may also be obtained at this step. At step 403, the procedure for allocating resources for the CS access is initiated, and this includes the selected codec. Finally, at step 404, transfer of the session to the CS access, using the selected codec, is initiated.

Figure 5:
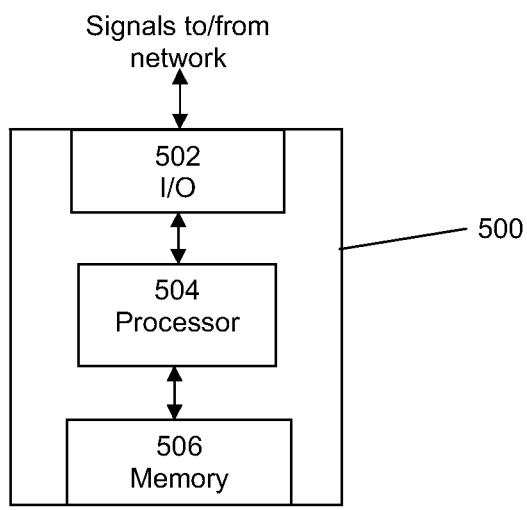
FIG. 5 is a schematic block diagram showing functional components in a network entity.

FIG. 5 is a schematic block diagram illustrating the principal functional entities of a MSC server 500 configured to implement the new procedures described above. The MSC server 500 includes an input/output 502 for sending and receiving messages to/from other network entities. A memory 506 stores data and programming instructions. A processor 504 implements the programming instructions such that when a request for a SRVCC handover of a session, established over a PS access via an IMS network, is received, the MSC server 500 obtains from the IMS network an indication of a voice codec that is currently being used for the session. The MSC server 500 is programmed to initiate the allocation of resources for the session in the CS access network by specifying the voice codec to be used in signals sent to the IMS network. The MSC server 500 also initiates transfer of the session to the CS access so that the session continues with use of the specified codec.

From the above it will be apparent that the following new procedures have been introduced: a new procedure to communicate with the IMS (ATCF/SCC AS) prior to resource establishment in the CS access network; and an active decision to select the same codec that is being used in the source (PS) access also in the target access (assuming it is supported in both).

It is an advantage that, when the session transfer takes place, only one codec is available to be used, and that is the common codec between the accesses (assuming it is supported in both). The selection of the same codec (and additional media parameters such as payload type) for both CS and PS accesses allows use of the best possible codec, and ensures that the transferred session can proceed without the need for transcoding. As a consequence, the problems discussed above of degradation of speech quality and inefficient use of resources where transcoding is required at the MGW, are substantially alleviated.

The invention claimed is:

1. A method of performing a session transfer with Single Radio Voice Call Continuity, SRVCC, from a Packet Switched, PS, access to a Circuit Switched, CS, access of a telecommunications session that has been established over the PS access via an IP Multimedia Subsystem, IMS, network, the method comprising:
   receiving a request for the transfer of the session, wherein the request includes information regarding a plurality of supported codecs;
   obtaining from the IMS network an indication of a voice codec that is currently being used for the session, wherein the indicated voice codec that is currently being used for the session is one of the plurality of supported codecs;
   initiating allocation of resources for the session in the CS access, including specifying the voice codec to be used based on the obtained codec indication; and
   initiating transfer of the session to the CS access so that the session continues with use of the specified voice codec.

2. The method of claim 1, wherein information relating to the media currently being used is obtained from the IMS network in addition to the indication of the voice codec.

3. The method of claim 2, wherein the information relating to the media currently being used comprises any of: bandwidth parameters, codec mode set of operation, payload type and payload type numbers.

4. The method of claim 1, wherein obtaining the indication of the currently used codec and any information relating to the media currently being used comprises sending a query to the IMS network requesting provision of information that includes the currently used codec indication.

5. The method of claim 4, wherein the IMS network responds to the query by providing the requested codec indication and any information relating to the media currently being used, and wherein the IMS network prioritizes the response.

6. The method of claim 5, wherein the query includes a priority indicator to trigger prioritization of the response by the IMS network.

7. The method of claim 1, wherein transferring the session to the CS access comprises sending a Session Initiation Protocol, SIP, signal to the IMS network to initiate the transfer, and wherein the SIP signal includes a Session Description with the codec indication and information relating to the media currently being used.

8. The method of claim 1, wherein obtaining the indication of the currently used codec and any information relating to the media currently being used comprises initiating the session transfer using a Session Initiation Protocol, SIP, signal sent to the IMS network and receiving a provisional response from the IMS network comprising a Session Description Protocol with the codec indication and any information relating to the media currently being used.

9. The method of claim 1, wherein the indication of the codec and any information relating to the media that is currently being used is obtained from an Access transfer Control Function, ATCF, a Service Centralization and Continuity, SCC, Application Server, AS, or an Emergency Access Transfer Function, EATF.

10. A Mobile Switching Centre, MSC, server of a telecommunications network comprising:
    an input/output for sending and receiving messages to/from other network entities;
    a memory storing data and programming instructions; and
    a processor implementing the programming instructions configured to
       action a request for transfer of a session established over a Packet Switched, PS, access via an IP Multimedia Subsystem, IMS, network to a Circuit Switched, CS, access with Single Radio Voice Call Continuity, SRVCC, wherein the request includes information regarding a plurality of supported codecs,
       obtain from the IMS network an indication of a voice codec that is currently being used for the session, wherein the indicated voice codec that is currently being used for the session is one of the plurality of supported codecs,
       initiate allocation of resources for the session in the CS access, including specifying the voice codec to be used based on the obtained codec indication, and
       initiate transfer of the session to the CS access so that the session continues with use of the specified codec.

11. The MSC server of claim 10, wherein the processor is further configured to obtain information relating to the media currently being used from the IMS network in addition to the indication of the codec.

12. A computer comprising:
    a processor; and
    a memory, wherein the memory stores instructions that when executed cause the processor to
       action a request for transfer of a session established over a Packet Switched, PS, access via an IP Multimedia Subsystem, IMS, network to a Circuit Switched, CS, access with Single Radio Voice Call Continuity, SRVCC, wherein the request includes information regarding a plurality of supported codecs,
       obtain from the IMS network an indication of a voice codec that is currently being used for the session, wherein the indicated voice codec that is currently being used for the session is one of the plurality of supported codecs,
       initiate allocation of resources for the session in the CS access, including specifying the voice codec to be used based on the obtained codec indication, and
       initiate transfer of the session to the CS access so that the session continues with use of the specified codec.

13. A non-transitory computer readable medium comprising instructions that when executed by a computer cause the computer to:
    action a request for transfer of a session established over a Packet Switched, PS, access via an IP Multimedia Subsystem, IMS, network to a Circuit Switched, CS, access with Single Radio Voice Call Continuity, SRVCC, wherein the request includes information regarding a plurality of supported codecs;
    obtain from the IMS network an indication of a voice codec that is currently being used for the session, wherein the indicated voice codec that is currently being used for the session is one of the plurality of supported codecs;
    initiate allocation of resources for the session in the CS access, including specifying the voice codec to be used based on the obtained codec indication; and
    initiate transfer of the session to the CS access so that the session continues with use of the specified codec.

* * * * *